(12) United States Patent
Naito et al.

(10) Patent No.: US 9,607,770 B2
(45) Date of Patent: Mar. 28, 2017

(54) METHOD FOR PRODUCING CAPACITOR

(71) Applicant: SHOWA DENKO K.K., Tokyo (JP)

(72) Inventors: Kazumi Naito, Tokyo (JP); Katsutoshi Tamura, Tokyo (JP)

(73) Assignee: SHOW A DENKO K.K., Tokyo (JP)

( * ) Notice: Subject to any disclaimer, the term of this patent is extended or adjusted under 35 U.S.C. 154(b) by 0 days.

(21) Appl. No.: 14/409,906

(22) PCT Filed: Apr. 9, 2013

(86) PCT No.: PCT/JP2013/002406
§ 371 (c)(1),
(2) Date: Dec. 19, 2014

(87) PCT Pub. No.: WO2013/190756
PCT Pub. Date: Dec. 27, 2013

(65) Prior Publication Data
US 2015/0340158 A1    Nov. 26, 2015

(30) Foreign Application Priority Data

Jun. 22, 2012 (JP) ................................. 2012-141504

(51) Int. Cl.
| | |
|---|---|
| H01G 9/00 | (2006.01) |
| C25D 11/26 | (2006.01) |
| H01G 9/052 | (2006.01) |
| H01G 9/07 | (2006.01) |
| H01G 9/15 | (2006.01) |

(52) U.S. Cl.
CPC .......... *H01G 9/0032* (2013.01); *C25D 11/26* (2013.01); *H01G 9/052* (2013.01); *H01G 9/07* (2013.01); *H01G 9/0525* (2013.01); *H01G 9/15* (2013.01)

(58) Field of Classification Search
CPC .............................. C25D 11/26; H01G 9/0032
See application file for complete search history.

(56) References Cited

U.S. PATENT DOCUMENTS

| | | | | |
|---|---|---|---|---|
| 3,332,859 A | * | 7/1967 | Dunn ..................... | C23G 1/106 134/41 |
| 5,621,608 A | * | 4/1997 | Arai ....................... | H01G 9/025 29/25.03 |
| 2001/0007167 A1 | | 7/2001 | Watanabe et al. | |
| 2009/0056093 A1 | * | 3/2009 | Sugawara ............ | H01G 9/0029 29/25.03 |
| 2009/0185330 A1 | | 7/2009 | Breznova et al. | |
| 2012/0137482 A1 | * | 6/2012 | Nakamura .......... | H01G 9/0032 29/25.03 |

FOREIGN PATENT DOCUMENTS

| | | | | |
|---|---|---|---|---|
| EP | 1117110 A2 | 7/2001 | | |
| JP | 10-79326 A | 3/1998 | | |
| JP | 10-106896 A | 4/1998 | | |
| JP | 11-150041 A | 6/1999 | | |
| JP | 2003272959 A | 9/2003 | | |
| JP | 2005-191421 A | 7/2005 | | |
| JP | 2006-108395 A | 4/2006 | | |
| JP | 2007-123569 A | 5/2007 | | |
| JP | 2009-064846 A | 3/2009 | | |
| JP | WO 2011013375 A1 | * | 2/2011 | ........... H01G 9/0032 |

OTHER PUBLICATIONS

Communication dated Jan. 20, 2016 from the European Patent Office issued in corresponding Application No. 13807191.
International Search Report for PCT/JP2013/002406 dated Jul. 16, 2013.

* cited by examiner

Primary Examiner — Bryan D. Ripa
(74) Attorney, Agent, or Firm — Sughrue Mion, PLLC

(57) ABSTRACT

A capacitor having at least an anode body composed of a tungsten sintered compact and having less leakage current under high-voltage conditions and less variation in leakage current values, obtained by a production method including the steps of: compacting a tungsten powder to obtain a compression body; firing the compression body to obtain an anode body; applying voltage to the anode body, which is used as an positive electrode, in an alkaline fluid; chemically converting the surface layer of the anode body into a dielectric; optionally removing water from the anode body; and heat-treating the anode body, whose surface has been chemically converted into a dielectric, at a temperature of 100° C. or more and 260° C. or less.

10 Claims, No Drawings

METHOD FOR PRODUCING CAPACITOR

CROSS REFERENCE TO RELATED APPLICATIONS

This application is a National Stage of International Application No. PCT/JP2013/002406 filed Apr. 9, 2013, claiming priority based on Japanese Patent Application No. 2012-141504, filed Jun. 22, 2012, the contents of all of which are incorporated herein by reference in their entirety.

TECHNICAL FIELD

The present invention relates to a method for producing a capacitor. More specifically, the present invention relates to a method for producing a capacitor having a tungsten anode body, wherein the capacitor has less leakage current and less variation in leakage current values under high-voltage conditions.

BACKGROUND ART

Known capacitors are obtained by subjecting an anode body composed of a tantalum sintered compact or a niobium sintered compact to electrolytic oxidation in an aqueous solution of phosphoric acid to chemically convert the surface layer of the sintered compact into a dielectric composed of metal oxide. Tungsten is known as one of valve action metals. When an anode body composed of a tungsten sintered compact is subjected to electrolytic oxidation under the same conditions as the conditions of electrolytic oxidation of an anode body composed of a tantalum sintered compact or a niobium sintered compact, a sufficiently dense dielectric layer with a suitable thickness can be not obtained, and there seem to be many defects that an electric current flows when voltage is applied. Accordingly, capacitors in which conventional anode bodies made of tungsten is applied have large leakage current.

PRIOR ART DOCUMENTS

Patent Documents

Patent Document 1: JP 4863509 B
Patent Document 2: JP 2007-123569 A
Patent Document 3: JP 2006-108395 A
Patent Document 4: JP H10-106896 A

SUMMARY OF THE INVENTION

Problems to be Solved by the Invention

When a tungsten anode body is left in the air, natural oxide films are likely to be formed on the surface of the anode body. Compared to electrolytic oxide films formed by chemical conversion, natural oxide films are uneven and thus have inferior withstand voltage characteristics. Moreover, slight natural oxide films are formed even after electrolytic oxide films are formed by chemical conversion. It is therefore important to control the thickness of natural oxide films formed after chemical conversion treatment to be constant between the inside and outside of pores.

An object of the present invention is to provide a method that effectively removes natural oxide films from a tungsten anode body, controls the formation of natural oxide films on the anode body after chemical conversion treatment so as to be constant between the inside and outside of pores, reduces leakage current under high-voltage conditions, and reduces variation in leakage current between capacitors.

Means for Solving the Problems

The present inventors conducted extensive studies to achieve the above object. As a result, the invention including the following embodiments has been completed.
[1] A method for producing a capacitor, in which the method comprises the steps of:
(1) applying voltage to a tungsten anode body, which is used as a positive electrode, in an alkaline fluid;
(2) chemically converting the surface of the anode body treated in the step (1) into a dielectric layer; and
(3) heat-treating the anode body treated in the step (2) at a temperature of 100° C. or more and 260° C. or less.
[2] The production method according to the above [1], wherein the tungsten anode body is composed of a sintered compact obtained by compacting a tungsten powder to obtain a compression body, and firing the compression body.
[3] The production method according to the above [1] or [2], wherein the voltage application in the step (1) is performed at a current of 0.1 to 20 mA per anode body.
[4] The production method according to any one of the above [1] to [3], wherein the voltage application in the step (1) is performed at a voltage of 0.1 to 20 V.
[5] The production method according to any one of the above [1] to [4], wherein the alkaline fluid is an aqueous solution containing at least one selected from the group consisting of alkali metal hydroxides, ammonia, and quaternary amines.
[6] The production method according to any one of the above [1] to [5], wherein water is removed from the anode body after the step (2) and before the step (3).

Advantageous Effects of the Invention

The production method of the present invention enables mass production of capacitors that have less leakage current under high-voltage conditions and less variation in leakage current between the capacitors.

Patent Documents 1 to 4 disclose similar methods in which a tantalum sintered compact or aluminum foil is subjected to cathode electrolytic cleaning or immersed in an alkaline fluid before chemical conversion treatment; however, these methods do not have an effect of stabilizing leakage current under high-voltage conditions, as in the present invention. The effect of the present invention can hardly be predicted from conventional techniques.

EMBODIMENTS FOR CARRYING OUT THE INVENTION

A method for producing a capacitor according to one embodiment of the present invention in which the method comprises the steps of: (1) applying voltage to a tungsten anode body, which is used as a positive electrode, in an alkaline fluid; (2) chemically converting the surface of the anode body treated in the step (1) into a dielectric layer; and (3) heat-treating the anode body treated in the step (2) at a temperature of 100° C. or more and 260° C. or less.

The tungsten anode body is, for example, a sintered compact obtained by compacting a tungsten powder to obtain a compression body, and firing the compression body.

The tungsten powder used in the present invention may be a tungsten metal simple or a tungsten alloy, and may contain impurities within a range that does not significantly adversely affect the characteristics of the obtained capacitor. The tungsten powder is not particularly limited, and may be a commercial product. Further, a tungsten powder produced in the following manner can also be used. For example, a tungsten powder having a desired particle size can be obtained by crushing a tungsten trioxide powder in a hydrogen flow. Moreover, a tungsten powder having a desired particle size can be obtained by reducing tungstic acid or tungsten halide using a reducing agent such as hydrogen, sodium or the like. Furthermore, a tungsten powder can be obtained from tungsten-containing mineral through known processes.

The tungsten anode body used in the present invention has an oxygen content of preferably 8% by mass or less, more preferably 0.05 to 8% by mass, and even more preferably 0.08 to 1% by mass. Examples of tungsten alloys include alloys composed of tungsten and valve action metals (e.g., tantalum, niobium, aluminum, titanium, vanadium, zinc, molybdenum, hafnium, zirconium or the like).

At least part of the surface of the tungsten anode body may be silicified, boronized, phosphorized, and/or carbonized or may be a mixture containing at least one of these forms of tungsten. Moreover, at least part of the surface of tungsten or a tungsten mixture may contain nitrogen.

Silicified tungsten can be obtained, for example, by mixing a tungsten powder with a silicon powder, and reacting the mixture by heating under reduced pressure (e.g., at $10^2$ Pa or less at 1,100 to 2,600° C.). This method results in the formation of tungsten silicide, such as $W_5Si_3$ or the like, in which the tungsten silicide is locally present in the surface layer within usually 50 nm from the tungsten particle surface.

Nitrogen-containing tungsten can be obtained, for example, by placing a tungsten powder under reduced pressure at 350 to 1,500° C., and flowing nitrogen gas for several minutes to several hours. The treatment for incorporating nitrogen may be performed during the temperature decrease after high-temperature treatment for silicifying the tungsten powder.

Carbonized tungsten can be obtained, for example, by placing a tungsten powder in a carbon electrode furnace under reduced pressure at 300 to 1,500° C. for several minutes to several hours. When nitrogen is flown in the carbon electrode furnace under predetermined conditions, nitrogen absorption occurs simultaneously with carbonization, and a tungsten powder in which part of the surface contains nitrogen and is carbonized can be obtained.

Boronized tungsten can be obtained, for example, by mixing a tungsten powder with a boron source, such as boron simple or a boron element-containing compound, and reacting the mixture by heating under reduced pressure.

Phosphorized tungsten can be obtained, for example, by mixing a tungsten powder with a phosphorus source, such as phosphorus simple or a phosphorus element-containing compound, and reacting the mixture by heating under reduced pressure.

The tungsten powder may contain a powder of a metal other than tungsten. Examples of the other metal include tantalum, niobium, aluminum, titanium, vanadium, zinc, molybdenum, hafnium, zirconium, and the like. The content of tungsten element in the tungsten powder is preferably 50% by mass or more, more preferably 80% by mass or more, and even more preferably 90% by mass or more.

The tungsten powder has a volume average primary particle size of preferably 0.1 to 1 μm, more preferably 0.1 to 0.7 μm, and even more preferably 0.1 to 0.3 μm. The tungsten powder may be a granulated powder. The granulated powder can be produced, for example, by sintering and grinding a non-granulated tungsten powder, etc. Alternatively, the granulated powder can be produced by sintering and grinding again the once-produced granulated powder. The granulated powder has a 50% particle size of preferably 20 to 170 μm, and more preferably 26 to 140 μm. The 50% particle size was determined from the volume-based accumulated particle size distribution by measuring the particle size distribution using a laser diffraction scattering method using a Microtrac HRA 9320-X100.

The method for compacting the tungsten powder is not particularly limited. For example, the tungsten powder can be compacted by pressure forming. A binder may be mixed with the raw material powder to facilitate pressure forming. Various conditions, including the powder amount and the compacting equipment, can be suitably determined so as to achieve the desired compacting density, etc. There is a method in which an anode lead wire, which is used as the terminal of an anode body, is implanted by burying it in the compression body when the raw material powder is compressed. The anode lead wire may be a metal wire, such as tungsten, tantalum, or niobium. There is another method in which an anode lead wire is connected by welding to the sintered compact afterward. In place of a metal wire, a metal plate or metal foil may be implanted or connected to the sintered compact.

Next, the compression body is fired. Firing can be performed in a known firing furnace. The temperature of firing is preferably 1,300 to 1,700° C., and more preferably 1,400 to 1,600° C. The firing time is preferably 10 to 50 minutes, and more preferably 15 to 30 minutes. When firing is performed at a high temperature or for a long period of time, spaces (pores) among tungsten particles decrease, and a dense sintered compact with a low pore volume tends to be obtained. When firing is performed at a low temperature or for a short period of time, the resulting sintered compact tends to have a large pore volume, but have low strength, which requires careful handling. Although the atmosphere during firing is not particularly limited, reduced pressure is preferred. When firing is performed, the above-mentioned silicification, boronization, phosphorization, or carbonization and/or treatment for incorporating nitrogen can also be performed.

A suitable form of the sintered compact as an anode body is such that one granular material and another granular material are intersected and connected in a beaded state. The granular materials are derived from the tungsten powder. The conductivity between the granular materials is ensured because the granular materials are intersected and connected to one another. There are pores among the granular materials connected in a beaded state, and the inside of the pores can be filled with a semiconductor layer, described later.

In the production method of the present invention, voltage is applied to the anode body, which is used as the positive electrode, in an alkaline fluid. Specifically, the anode body is immersed in an alkaline fluid to a predetermined position, and electricity is applied while using the anode body as the positive electrode, and a conductor (e.g., a metal bath) placed in the liquid as the negative electrode. Natural oxide films on the surface of the anode body are removed by this voltage application. However, the voltage application does not cause the formation of a dielectric layer on the anode body. This can be assumed from the fact that a phenomenon unique to chemical conversion, that is, the current value decreases when electricity is applied at a constant voltage, does not occur.

The alkaline fluid is an aqueous solution containing a basic compound, preferably a aqueous solution containing at least one selected from the group consisting of alkali metal hydroxides, ammonia, and quaternary amines, such as tetramethylammonium hydroxide. The basic compound content, voltage application time, applied voltage value, current density, solution temperature, and other conditions can be suitably determined, in consideration of the mass and size of the anode body, so that the conditions are sufficient for removing natural oxide films of the anode body. The amount of the basic compound contained in the alkaline fluid is preferably 0.1 to 10% by mass. The electric current per anode body, i.e., current density (based on the number of anode bodies), is preferably 0.1 to 20 mA per anode body. The voltage applied is preferably 0.1 to 20 V. The voltage application time is preferably 10 minutes to 20 hours. The temperature of the alkaline fluid is preferably not less than the freezing point of the alkaline fluid and not more than 30° C. Within this temperature range, the dissolution rate of the anode body in the alkaline fluid is slow, and it is easy to control removal of natural oxide films by voltage application.

When the anode body is only immersed in an alkaline fluid without voltage application, leakage current characteristics are not improved, which is presumably because it is difficult to remove natural oxide films formed deep in the pores of the anode body (Comparative Examples 3 and 4).

After the voltage application in the alkaline fluid, the anode body is washed with pure water, etc., to remove the alkaline fluid. Then, the anode body is dried naturally or by forced air. The temperature of drying is preferably room temperature, specifically 10 to 40° C.

After drying, the surface of the anode body is chemically converted into a dielectric layer (chemical conversion treatment). Compared to anode bodies produced from a material as tantalum or niobium, tungsten anode bodies seem to be more likely to have uneven natural oxide films; therefore, it is preferable that the time interval from the completion of drying to the start of chemical conversion treatment is controlled within a predetermined range. Different time intervals are likely to cause variation in the characteristics of dielectric layers. When possible, it is more preferable that chemical conversion is performed immediately after the completion of drying to form a dielectric layer.

In the chemical conversion treatment, for example, the anode body is immersed in a chemical conversion liquid to a predetermined position, and voltage is applied to perform electrolytic oxidation. Voltage is applied between the anode body, which serves as the positive electrode, and the counter electrode, which serves as the negative electrode. Electricity can be applied to the anode body through the implanted anode lead wire. Examples of the chemical conversion liquid include a solution containing an electrolyte, such as nitric acid, sulfuric acid, phosphoric acid, oxalic acid, or adipic acid, and optionally an oxygen supplying agent, such as hydrogen peroxide or ozone; or a solution containing an oxidant composed of an oxygen-containing compound, such as a manganese(VII) compound, a chromium(VI) compound, a halogen acid compound, a persulfuric acid compound, or an organic peroxide. The chemical conversion liquid used in the present invention is preferably a solution containing an oxidant composed of an oxygen-containing compound, from the viewpoint of reducing leakage current.

It is preferable that the voltage application in the chemical conversion treatment is started at a predetermined initial current density, and this current density value is maintained; and that when the voltage reaches a predetermined value (chemical conversion voltage), this voltage value is maintained. The chemical conversion voltage can be appropriately determined depending on the desired withstand voltage.

Although the voltage application time can be suitably determined depending on the size of the anode body and the initial current density, it is preferably 3 to 11 hours, more preferably 5 to 10 hours, and even more preferably 5 to 7 hours.

The temperature of the chemical conversion liquid can be suitably determined depending on the type of chemical conversion liquid. For example, when the chemical conversion liquid is a solution containing an electrolyte, the temperature of the chemical conversion liquid is preferably not less than the freezing point of the solution and not more than 30° C., more preferably 0 to 20° C., and even more preferably 5 to 20° C. When the chemical conversion liquid is a solution containing an oxidant composed of an oxygen-containing compound, the temperature of the chemical conversion liquid is preferably not more than 62° C., more preferably 0 to 60° C., and even more preferably 45 to 60° C.

The chemical conversion treatment causes oxidization of tungsten in the surface of the anode body, thereby forming a dielectric layer containing tungsten oxide. The dielectric layer can be controlled to have a desired thickness by adjusting the chemical conversion voltage.

After the chemical conversion treatment, the anode body is pulled out of the chemical conversion liquid, and immediately washed with pure water. The chemical conversion liquid is removed as much as possible by the water washing. After the water washing, water permeating into the anode body is removed at a temperature of less than the boiling point of water. Water removal can be performed, for example, by drying the anode body under reduced pressure so as not to result in bumping (i.e., at a temperature of less than the boiling point of water under the pressure of drying), or by bringing the anode body into contact with a solvent that is miscible with water.

A preferred example of the solvent miscible with water is at least one selected from acetic acid, acetone, acetonitrile, dimethylformamide, dimethylsulfoxide, dioxane, propanol, ethanol, methanol, and tetrahydrofuran. When the anode body is dried, without removing water, at a temperature higher than the boiling point of water, the dielectric layer may be deteriorated, and the capacitance in a high frequency range may be reduced.

After the water removal, heat treatment is performed. Heat treatment is performed at 100° C. or more, and preferably 160° C. or more. The upper limit of temperature during heat treatment is preferably 260° C. It is more preferable to perform heat treatment first at a temperature of not less than 105° C. and less than 160° C., and then at a temperature of not less than 160° C. and not more than 230° C. When heat treatment is performed at such a temperature, the capacitance of the capacitor increases. When the temperature of heat treatment is too low, the effect of increasing capacitance may not be obtained, causing variation in the capacitance among capacitors. When the temperature of heat treatment is too high, leakage current may increase, and dielectric loss tangent may increase.

The time of heat treatment is not particularly limited within a range that can maintain the stability of the dielectric layer. The time is preferably 10 minutes to 4 hours, and more preferably 20 minutes to 2 hours. Chemical conversion treatment may be performed again after heat treatment. The second chemical conversion treatment can be performed under the same conditions as those of the first chemical conversion treatment. After the second chemical conversion treatment, pure water washing, water removal, and heat treatment can be performed in the same manner as above.

The anode body treated by chemical conversion and returned to room temperature is immediately placed in a thermo-hygrostat set to predetermined conditions, or is subjected to a cathode production process within a predetermined period of time. When the anode body treated by chemical conversion and returned to room temperature (hereinafter also referred to as "the member") is directly subjected to a cathode production process, it is desirable to keep constant the time after the member is returned to room temperature and before the member is subjected to the cathode production process. When the member stored in a thermo-hygrostat is subjected to a cathode production process, it is desirable to keep constant the time after the member is taken out from the thermo-hygrostat and before the member is subjected to the cathode production process. When the member is stored in a thermo-hygrostat, it is preferable to set the temperature at 30° C. or less, and the humidity at 30% or less; and it is more preferable to maintain the humidity as low as possible. For example, the member is stored in a desiccator that is maintained at a constant temperature.

A cathode is formed in the member obtained by the above method. Any cathode that is used in conventional electrolytic capacitors can be used without limitation. The cathode is, for example, an electrolyte, or an inorganic or organic semiconductor layer. Examples of electrolytes for the cathode include solutions of salts of tertiary amines or quaternary amines or solutions of sulfuric acid, etc. Examples of inorganic semiconductor layers include manganese dioxide layers, etc. Examples of organic semiconductor layers include a layer made of polypyrrole or a derivative thereof, a layer made of polythiophene or a derivative thereof (e.g., a polymer of 3,4-ethylenedioxythiophene), a layer made of polyaniline or a derivative thereof, and other electric conductive polymer layers. Further, a conductor layer, such as a carbon paste layer, silver paste layer, or metal plating layer, may be formed on the organic or inorganic semiconductor layer.

A cathode lead is electrically connected to the above cathode, and part of the cathode lead is exposed to the outside of the exterior of the electrolytic capacitor to serve as a cathode external terminal. On the other hand, an anode lead is electrically connected to the anode body via the anode lead wire, and part of the anode lead is exposed to the outside of the exterior of the electrolytic capacitor to serve as an anode external terminal. A normal lead frame can be used to attach the cathode lead and the anode lead. Then, the exterior is formed by sealing with resin, etc., thereby obtaining a capacitor. The thus-produced capacitor may be subjected to aging treatment, as required. The capacitor of the present invention can be used by mounting it in various electric circuits or electronic circuits.

EXAMPLES

The present invention is explained in more detail below with reference to Examples. Note that they are merely examples for explanation, and the present invention is not limited thereto.

Example 1

Production of Anode Body

A tungsten powder having a 50% particle size (D50) of 0.5 μm was mixed with 0.3% by mass of silicon powder having a 50% particle size (D50) of 1 μm, and the mixture was then allowed to stand for 30 minutes at 1,450° C. under vacuum. The mixture was returned to room temperature, and the resulting block object was crushed by a hammer mill, thereby producing a granulated powder having a 50% particle size (D50) of 105 μm (range of particle size distribution: 26 to 145 μm). Part of silicon was reacted with tungsten, and an alloy of tungsten silicide was present in the tungsten surface layer.

Compression bodies were produced from the granulated powder. When forming, tungsten wires (lead wires) having a diameter Φ of 0.29 mm were implanted. The compression bodies were put in a vacuum firing furnace, and fired at 1,520° C. for 20 minutes, thereby producing 1,000 sintered compacts with a size of 1.0 mm×1.5 mm×4.5 mm (each lead wire was implanted in the 1.0 mm×1.5 mm surface). The produced sintered compacts with a lead wire were used as anode bodies. The mass of each anode body except for the lead wire was 56 mg.

[Alkali Treatment]

As an alkaline fluid, 0.1% by mass of sodium hydroxide aqueous solution was prepared. Each anode body was immersed in the alkaline fluid to a predetermined position. The anode body was used as the positive electrode, and voltage was applied for 15 minutes at room temperature at a voltage of 2.5 V at a current density of 1 mA per anode body. A platinum plate placed in the alkaline fluid was used as the negative electrode. The anode body was then pulled out of the alkaline fluid, and washed with pure water to remove the alkaline fluid. Thereafter, the anode body was immersed in an alcohol liquid to remove water. The anode body was pulled out of the alcohol liquid, and dried by forced air at ambient temperature. Subsequently, chemical conversion treatment was immediately performed as follows.

[Formation of Dielectric Layer]

i) Chemical Conversion Treatment

As a chemical conversion liquid, 0.1% by mass nitric acid aqueous solution was prepared. The chemical conversion liquid was placed in a stainless steel container. The anode body was immersed in the chemical conversion liquid to a predetermined position. The lead wire was electrically connected to the positive pole of a power supply, and the container was electrically connected to the negative pole of the power supply. Voltage application was started at a chemical conversion liquid temperature of 15° C. at an initial current density of 1 mA per anode body, and this current density value was maintained. When the voltage reached 10 V, the 10-V voltage was maintained for 5 hours.

ii) Water Washing—Water Removal—Heat Treatment

Subsequently, the anode body was washed with pure water to remove the chemical conversion liquid in pores of the anode body. The anode body was then immersed in ethanol and the ethanol was stirred, thereby removing most of water adhering to the inside of the pores, etc. The anode body was pulled out of the ethanol, and dried by forced air at ambient temperature. Subsequently, heat treatment was performed at 190° C. for 60 minutes. Thus, anode bodies having a dielectric layer on the surface thereof were obtained.

The above series of alkali treatment, chemical conversion treatment, water washing, water removal, and heat treatment was performed on 32 anode bodies for each batch. Four batches were performed in total.

Subsequently, the anode bodies having a dielectric layer treated in the above manner were stored in a thermo-hygrostat (23° C., 30 RH %) for 30 minutes. And, 32 anode bodies were taken out of the thermo-hygrostat, and the leakage current was measured. It took 1,280 seconds from the completion of measurement of the 1st anode body to the completion of measurement of the 32nd anode body.

The leakage current of each anode body was measured in a 30% by mass sulfuric acid aqueous solution using the lead wire as the positive electrode, and a platinum black plate placed in the solution as the negative electrode, under conditions of room temperature, 7 V, and 30 seconds. Table 1 shows the range of the measured leakage current values of 128 anode bodies. The electrolytic capacitor used in the leakage current measurement is configured such that the dielectric layer is disposed between tungsten (positive pole of the capacitor) and the 30% by mass sulfuric acid aqueous solution (negative pole of the capacitor).

Example 2

Anode bodies having a dielectric layer were produced in the same manner as in Example 1, except that the chemical conversion liquid was changed to a 0.5% nitric acid aqueous solution, the solution temperature during chemical conversion treatment was changed to 15° C., and the temperature and time of heat treatment were changed to 160° C. and 90 minutes, respectively. The leakage current of the anode bodies was measured in the same manner as in Example 1. Table 1 shows the average and variation of the measured leakage current values of 128 anode bodies.

Example 3

Production of Anode Body

Tungsten trioxide was subjected to hydrogen reduction to produce a tungsten powder having a 50% particle size (D50) of 0.7 μm. The tungsten powder was mixed with 0.5% by mass of commercially available bismuth powder having a 50% particle size (D50) of 1 μm. The powder mixture was allowed to stand for 30 minutes at 300° C. under vacuum. After returning to room temperature, the powder mixture was mixed again, and allowed to stand for 30 minutes at 1,360° C. under vacuum. After the mixture was returned to room temperature, the block object was crushed by a hammer mill and classified, thereby producing a granulated powder having a 50% particle size (D50) of 105 μm (range of particle size distribution: 26 to 130 μm).

The granulated powder was mixed with 2% by mass or more of acrylic resin, and compression bodies were produced from the mixture using a TAP2 forming machine (produced by Seiken Co., Ltd.). When forming, tantalum wires (lead wires) having a diameter Φ of 0.29 mm were implanted. The compression bodies were placed in a vacuum firing furnace, and fired at 1,420° C. for 30 minutes, thereby producing 1,000 sintered compacts with a size of 1.0 mm×1.5 mm×4.5 mm (each 6 mm of lead wire was implanted in the 1.0 mm×1.5 mm surface). The produced sintered compacts with a lead wire were used as anode bodies. The mass of each anode body except for the lead wire was 56 mg.

[Alkali Treatment]

As an alkaline fluid, 0.1% by mass potassium hydroxide aqueous solution was prepared. Each anode body was immersed in the alkaline fluid to a predetermined position. The anode body was used as the positive electrode, and voltage was applied for 15 minutes at 15° C. at a voltage of 2.5 V at a current density of 2 mA per anode body. A platinum plate placed in the alkaline fluid was used as the negative electrode. The anode body was then pulled out of the alkaline fluid, and washed with pure water to remove the alkaline fluid. Thereafter, the anode body was immersed in an alcohol liquid to remove water. The anode body was pulled out of the alcohol liquid, and dried by forced air at ambient temperature. Subsequently, chemical conversion treatment was immediately performed as follows.

[Formation of Dielectric Layer]

i) Chemical Conversion Treatment

As a chemical conversion liquid, 2% by mass ammonium persulfate aqueous solution was prepared. The chemical conversion liquid was placed in a stainless steel container. The anode body was immersed in the chemical conversion liquid to a predetermined position. The lead wire was electrically connected to the positive pole of a power supply, and the container was electrically connected to the negative pole of the power supply. Voltage application was started at a chemical conversion liquid temperature of 45° C. at an initial current density of 1 mA per anode body, and this current density value was maintained. When the voltage reached 20 V, the 20-V voltage was maintained for 7 hours.

ii) Water Washing—Water Removal—Heat Treatment

Subsequently, the anode body was washed with pure water to remove the chemical conversion liquid in pores of the anode body. The anode body was then immersed in ethanol and stirred, thereby removing most of water. The anode body was pulled out of the ethanol, and dried by forced air at ambient temperature. Subsequently, heat treatment was performed at 260° C. for 30 minutes. Thus, anode bodies having a dielectric layer on the surface thereof were obtained.

The above series of alkali treatment, chemical conversion treatment, water washing, water removal, and heat treatment was performed on 32 anode bodies for each batch. Four batches were performed in total.

The leakage current of the anode bodies was measured in the same manner as in Example 1. Table 1 shows the average and variation of the measured leakage current values of 128 anode bodies.

Example 4

Anode bodies having a dielectric layer were produced in the same manner as in Example 3, except that the chemical conversion liquid was changed to a 4% potassium persulfate aqueous solution, the liquid temperature during chemical conversion treatment was changed to 25° C., and the temperature and time of heat treatment were changed to 230° C. and 120 minutes, respectively. The leakage current of the anode bodies was measured in the same manner as in Example 1. Table 1 shows the average and variation of the measured leakage current values of 128 anode bodies.

Comparative Examples 1 and 2

Anode bodies having a dielectric layer were produced in the same manner as in Examples 1 and 3, except that alkali treatment was not performed. The leakage current of the anode bodies was measured in the same manner as in Example 1. Table 1 shows the average and variation of the measured leakage current values of 128 anode bodies.

Comparative Examples 3 and 4

Anode bodies having a dielectric layer were produced in the same manner as in Examples 1 and 3, except that voltage was not applied in the alkali treatment. The leakage current of the anode bodies was measured in the same manner as in Example 1. Table 1 shows the average and variation of the measured leakage current values of 128 anode bodies.

Example 5

Anode bodies having a dielectric layer were produced in the same manner as in Example 3, except that heat treatment was performed at 105° C. for 15 minutes. The leakage current of the anode bodies was measured in the same manner as in Example 1. Table 1 shows the average and variation of the measured leakage current values of 128 anode bodies.

Comparative Example 5

Anode bodies having a dielectric layer were produced in the same manner as in Example 5, except that alkali treatment was not performed. The leakage current of the anode bodies was measured in the same manner as in Example 1. Table 1 shows the average and variation of the measured leakage current values of 128 anode bodies.

TABLE 1

| | Alkali treatment | Chemical conversion treatment | Heat treatment | Leakage current (μA) |
|---|---|---|---|---|
| Ex. 1 | Voltage applied | 0.1% nitric acid aqueous solution 15° C. | 190° C., 60 min | 2.4 ± 0.4 |
| Ex. 2 | Voltage applied | 0.5% nitric acid aqueous solution 25° C. | 160° C., 90 min | 2.1 ± 0.3 |
| Ex. 3 | Voltage applied | 2% ammonium persulfate aqueous solution 45° C. | 260° C., 30 min | 1.7 ± 0.2 |
| Ex. 4 | Voltage applied | 4% potassium persulfate aqueous solution 25° C. | 230° C.,, 120 min | 1.8 ± 0.2 |
| Comp. Ex. 1 | No alkali treatment | 0.1% nitric acid aqueous solution 15° C. | 190° C., 60 min | 7.5 ± 2.6 |
| Comp. Ex. 2 | No alkali treatment | 2% ammonium persulfate aqueous solution 45° C. | 260° C., 30 min | 5.9 ± 3.1 |
| Comp. Ex. 3 | Immersion only | 0.1% nitric acid aqueous solution 15° C. | 190° C., 60 min | 6.3 ± 2.2 |
| Comp. Ex. 4 | Immersion only | 2% ammonium persulfate aqueous solution 45° C. | 260° C., 30 min | 5.2 ± 3.0 |
| Ex. 5 | Voltage applied | 2% ammonium persulfate aqueous solution 45° C. | 105° C., 15 min | 3.6 ± 1.7 |
| Comp. Ex. 5 | No alkali treatment | 2% ammonium persulfate aqueous solution 45° C. | 105° C., 15 min | 6.3 ± 3.5 |

Note that the range represented by using "±" in the table indicates that all of the measured results of the samples fell within that range.

Note that the range represented by using "±" in the table indicates that all of the measured results of the samples fell within that range.

As shown in Table 1, according to the production method of the present invention, when voltage is applied to anode bodies in an alkaline fluid, the surface layer of each anode body is formed into a dielectric by chemical conversion, and the anode bodies having a dielectric on the surface thereof by chemical conversion are heat-treated at a temperature of 160° C. or more and 260° C. or less, the leakage current of the anode bodies is reduced, and variation in leakage current is also reduced.

The invention claimed is:

1. A method for producing a capacitor, in which the method comprises the steps of:
    (1) applying voltage to a tungsten anode body, which is used as a positive electrode, in an alkaline fluid;
    (2) chemically converting the surface of the anode body treated in the step (1) into a dielectric layer; and
    (3) heat-treating the anode body treated in the step (2) at a temperature of 100° C. or more and 260° C. or less.

2. The production method according to claim 1, wherein the tungsten anode body is composed of a sintered compact obtained by compacting a tungsten powder to obtain a compression body, and firing the compression body.

3. The production method according to claim 2, wherein the voltage application in the step (1) is performed at a current of 0.1 to 20 mA per anode body.

4. The production method according to claim 2, wherein the voltage application in the step (1) is performed at a voltage of 0.1 to 20 V.

5. The production method according to claim 2, wherein the alkaline fluid is an aqueous solution containing at least one selected from the group consisting of alkali metal hydroxides, ammonia, and quaternary amines.

6. The production method according to claim 2, wherein water is removed from the anode body after the step (2) and before the step (3).

7. The production method according to claim 1, wherein the voltage application in the step (1) is performed at a current of 0.1 to 20 mA per anode body.

8. The production method according to claim 1, wherein the voltage application in the step (1) is performed at a voltage of 0.1 to 20 V.

9. The production method according to claim 1, wherein the alkaline fluid is an aqueous solution containing at least one selected from the group consisting of alkali metal hydroxides, ammonia, and quaternary amines.

10. The production method according to claim 1, wherein water is removed from the anode body after the step (2) and before the step (3).

* * * * *